April 1, 1952 S. J. RIPICH 2,591,294
FISHHOOK SUPPORT AND SINKER
Filed April 30, 1949

INVENTOR.
STEPHEN J. RIPICH
BY
Morton S. Brock

Patented Apr. 1, 1952

2,591,294

UNITED STATES PATENT OFFICE 2,591,294

FISHHOOK SUPPORT AND SINKER

Stephen J. Ripich, Cleveland, Ohio

Application April 30, 1949, Serial No. 90,703

3 Claims. (Cl. 43—43.15)

1

This invention relates to fishing tackle and particularly to a rig for supporting the hook and bait clear of the bed of the body of water being angled.

Conducive to a better understanding of this invention it may be well to point out that in angling for certain kinds of fish it is desirable to have the hook and bait close to, but above the bottom of the body of water. If the tackle heretofore in common use is weighted to bring the hook to the bottom, it will either lie upon the bottom or become entangled in any growing plants or rocks that may cover the bottom.

The primary object of this invention, therefore, is to provide an angling rig, for still fishing, that will support the hook and bait thereon above the bed of the body of water where used so as to make the bait more attractive to the fish and also to prevent live bait from hiding under rocks or other debris on the bed of the body of water, and also to eliminate to a considerable extent the catching of undesirable forms of marine life having their habitat in the muddy bottom of water courses.

Another object is to provide apparatus of the type stated that includes a self-righting sinker that rests on the bottom of a river or lake and supports the hook a predetermined distance above the bottom without the use of any float or other buoyant structure.

A further object is to provide an angling rig having a self-righting sinker whose upper surface is finished in a bright fish-scale pattern that acts as an attraction to marine life thereby functioning to lure fish to the vicinity of the baited hook suspended above the sinker.

Still another object is to provide an angling rig of the type stated that is connected to the fishing line in such a manner that the line is rendered very sensitive to bites; the slightest pull on the baited hook being transmitted along the line to the hand of the angler.

These and other objects of the invention will become apparent from a reading of the following specification and claims together with the accompanying drawing wherein:

2

Figure 5:
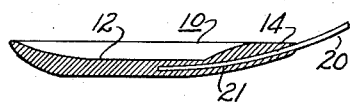
Figure 6:
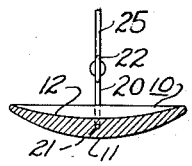
Figure 3:
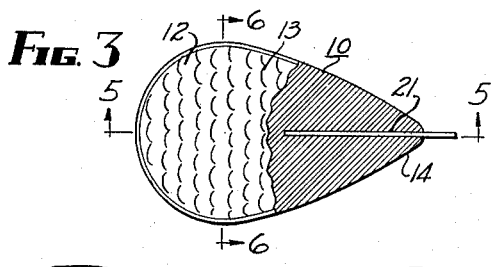
Figure 3 is a top plan view of the sinker member with a portion broken away to show the method of joining the bracket member thereto.
Figure 4:
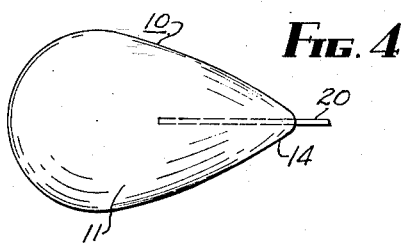
Figure 7:
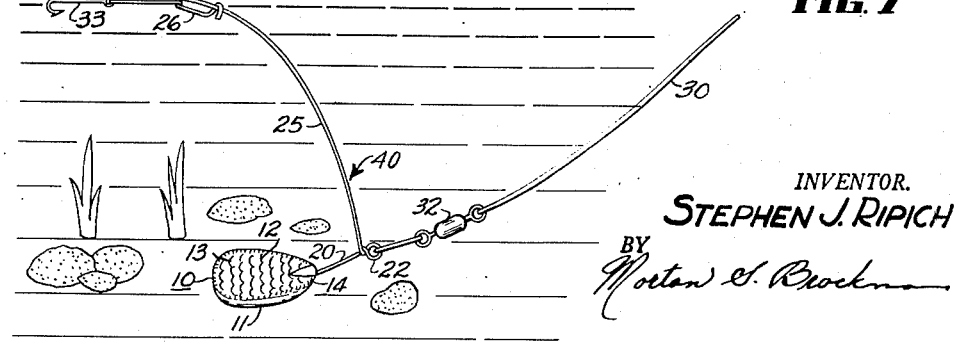

Figure 4 is a bottom plan view of the same;

Figure 5 is a longitudinal sectional view through the sinker member taken along the line and in the direction of the arrows 5—5 of the Figure 3;

Figure 6 is a cross-sectional view of the same taken along the line and in the direction of the arrows 6—6 of the Figure 3; and Figure 7 is a perspective view showing the invention in operative position.

Referring to the drawings there is shown an angling rig made in accordance with this invention. The device consists broadly of three elements or members, the sinker or stabilizer, the lower leg and the upright leg.

Each of these are broadly indicated by the reference characters 10, 20 and 25 respectively, and will be described in detail in the order set forth.

The sinker or stabilizer 10 is preferably made of a heavy non-rusting metal such as lead and may be either stamped, die cast or formed by simple casting in a mold, whichever is the most economical at the time of manufacture. The shape of the stabilizer 10 should be such that the completed stabilizer has self righting qualities which will cause it to return to an upright position when tilted.

In the preferred form of the stabilizer or sinker 10 illustrated in the drawing, the sinker is substantially ovate or pear-shaped in plan view, with a concave or inwardly curved upper surface 12 and a convex or outwardly curved bottom surface 11, as is shown most clearly in the sectional views of Figures 5 and 6. The transverse cross-section of said sinker throughout substantially its entire length being substantially crescent shaped, with a greater thickness at the central portion of the section than at the ends. The upper and lower lines, 12 and 11 respectively, defining said section having different radii of curvature.

The top or concave surface 12 is given a fish scale patterned finish and, being silvery in color, acts as a lure for fish as is shown in the Figures 1, 2, 3 and 7.

Any force tending to tip the sinker on its edge will be strongly resisted by the inertia of the mass of metal concentrated along the median line of the sinker. The sinker 10 will therefore maintain its upright position.

The weight of the sinker can be varied between wide limits in order to adapt the rig for use with varying conditions of stream flow, cross-currents, and different types of bait. In the preferred form shown, a two ounce sinker is portrayed.

Reference numeral 40 indicates a substantially L shaped wire having its upright leg 25 provided with a first loop or eyelet 26 at the upper end thereof adapted to engage a fish hook or snell, its other leg 20 being embedded in the narrow end 14 of the pear-shaped sinker member 10 as shown in the Figures 3, 4 and 5. The legs 20 and 25 being provided at their adjoining ends with a second loop 22 constituting a connection for the fishing line 30.

The leg 20 extends upward and away from the narrow end of the pear-shaped sinker 10, as shown in the Figure 5, and is approximately ½ to ¾ as long as the sinker, the second loop 22 being so located relative to the adjacent end of the sinker 10 as to be above the bottom of the sinker when the sinker is in its normal operative position. This configuration imparts a resiliency to the leg 20 which enables the vibrations of the nibble of a fish upon the lure attached to the upper loop 26 to be transmitted to the fish line without being dampened by the mass of the sinker.

Figure 1:
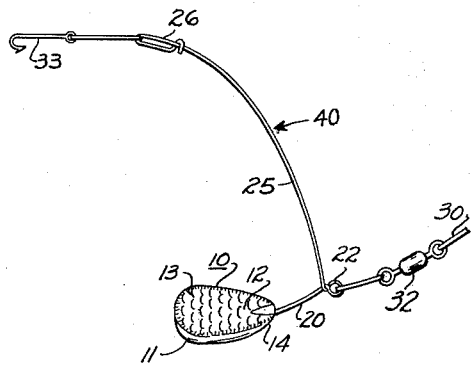
Figure 1 is a perspective view of the angling rig as it appears with a fish hook and the fishing line attached thereto.
Figure 2:
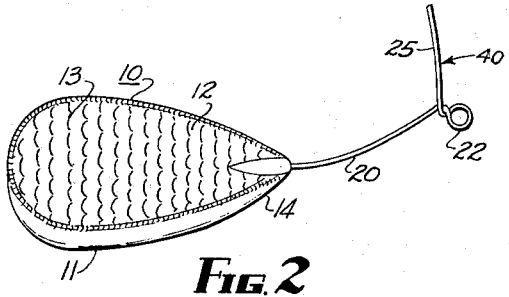
Figure 2 is an enlarged perspective view of the apparatus illustrating the sinker and bracket members thereof.

The upright leg 25 ascends upward and is curved toward the broad end of the pear-shaped sinker, the upper surface of the sinker being concave and faced toward the curved upright leg 25 as shown in the Figures 1, 6 and 7.

In their preferred forms, as shown, the legs 20 and 25 are made of a single length of stainless steel wire about .025 inch in diameter. This gage wire is resilient and flexible and is twisted and shaped to form the eyelet 22 intermediate its ends. The wire thus divided forms the lower leg 20 which is embedded in the lead sinker 10 and the upright leg 25. A hook retaining eyelet 26 is formed on the free end of the upright leg.

The gage of the wire used may be varied to meet the conditions encountered, but it is important that the wire used be resilient and flexible under the operating conditions of its intended use.

In using this angling rig, the baited hook 33 is attached either directly or by means of a short snell to the support eyelet 26, as shown in the Figure 1, and the fish line 30 is connected to the loop or eyelet 22. Reference character 32 indicates a small swivel of the type well known to fishermen that prevents any twisting action of the fish line to be communicated to the rig.

The angling rig is thrown to the bottom of a body of water as shown in Figure 7. The fish line is permitted to be slack and the sinker or stabilizer thereupon rests upon the bottom with its convex side 11 down. The self-righting characteristics of the stabilizer 10 exert themselves and the sinker will take the upright position shown with the support member 25 supporting the hook 33 above the bottom of the lake bed and above the marine growth and rocks as shown.

Any tendency of water-currents or other forces to tilt the hook 33 and its support 25 sideways will be communicated to the stabilizer 10 through the leg 20. The stabilizer will resist tilting action and return the attached upright leg 25 to its vertical position. This flexing and movement of the resilient wire leg 25 imparts a life-like movement to the baited hook 33 and the swaying movement of the shining concave fish-scale marked upper surface 13 of the stabilizer 10 acts to attract the attention of passing fish which may start to investigate this lure and then notice the baited hook for the first time.

It will thus be seen that the hook 33 is positively kept above the lake bottom at all times without the aid of any buoyant members such as corks, hollow spheres, and the like, employed by others in their attempt to solve this problem.

It will be further seen that the fish line 30 is connected to the rig by means of the loop 22 that is positioned between the upright leg 25 and the other leg 20. Any movement of the resilient legs 25 and 20 due to the nibbling or biting fish is communicated directly to the fish line 30. The shock wave of the moving hook does not have to pass through the lead weight or sinker 10 as would be the case if the hook and line were attached to the opposite sides of the sinker.

This structure makes the line extremely sensitive to biting fish and increases the fisherman's catch due to the fact that many nibbling fish, which often escape when still fishing with other types of tackle, are caught when my improved angling rig is used, because the angler is immediately aware of the fish's presence and can act to set the hook.

Another advantage of this angling rig is that the sinker or stabilizer 10 tends to rise from the bottom of the body of water when the line is pulled in, instead of dragging along the bottom where it may become caught in the marine growth or wedged between rocks and thus lost. This rising action is due to the fact that the fish line is attached to the loop 26 which is, in turn, attached to the narrow end 14 of the ovate sinker 10. Therefore, when the sinker is drawn through the water by a pull on the line 33, the water flows smoothly around the streamlined narrow sinker end 14 and over the concave and convex upper and lower surfaces 12 and 11 of the sinker 10, which causes it to slip through the water without creating eddy currents that might oppose its movement.

It will now be clear that here has been provided a device that accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claims.

I claim:

1. A combined self righting sinker and lure support comprising an L-shaped wire having its upright leg provided with a loop at the upper end thereof and its other leg being provided with a sinker at its free end, said legs being provided at their adjoining ends with a loop constituting a connection for a fishing line, said sinker being substantially pear shaped in plan view and having its apex secured to the free end of the other leg, the transverse cross-section of said sinker throughout substantially its entire length being substantially crescent shaped with a greater thickness at the central portion of the section than at the ends, the upper and lower lines defining said section having different radii of curvature, the upper surface of said sinker being concave and said second loop being so located relative to the adjacent end of the sinker as to be above the bottom of the sinker when the sinker is in its normal operative position.

2. A combined self-righting sinker and lure support comprising an L-shaped wire having its upright leg provided with a loop at the upper end thereof and its other leg being provided with a sinker at its free end, said legs being provided at their adjoining ends with a loop constituting a connection for a fishing line, said sinker being substantially pear-shaped in plan view and having its apex secured to the free end of the other leg, the transverse cross-section of said sinker throughout substantially its entire length being substantially crescent shaped with a greater thickness at the central portion of the section than at the ends, the upper and lower lines defining said section having different radii of curvature, the upright leg being curved toward the broad end of the pear shaped sinker, the upper surface of said sinker being concave and faced toward the curved upright leg and the second loop being so located relative to the adjacent end of the sinker as to be above the bottom of the sinker when the sinker is in its normal operative position.

3. A combined self-righting sinker and lure support comprising an L-shaped wire having its upright leg provided with a loop at the upper end thereof and its other leg being provided with a sinker at its free end, said legs being provided at their adjoining ends with a loop constituting a connection for a fishing line, said sinker being substantially pear-shaped in plan view and having its apex secured to the free end of the other leg, the transverse cross-section of said sinker throughout substantially its entire length being substantially crescent shaped with a greater thickness at the central portion of the section than at the ends, the upper and lower lines defining said section having different radii of curvature, the upright leg being curved toward the broad end of the pear shaped sinker, the upper surface of said sinker being concave and faced toward the curved upright leg and the other leg being approximately one-half to three-fourths the length of the sinker and curved upwardly away from the apex thereof in line with the upward curvature of the base, whereby the second loop is maintained above the bottom of the sinker when the sinker is in its operative position.

STEPHEN J. RIPICH.

REFERENCES CITED

The following references are of record in the file of this patent:

UNITED STATES PATENTS

| Number | Name | Date |
| --- | --- | --- |
| 756,009 | Flegle | Mar. 29, 1904 |
| 1,391,670 | Dills | Sept. 27, 1921 |
| 1,974,381 | Swanson et al. | Sept. 18, 1934 |
| 2,157,819 | Eckert | May 9, 1939 |
| 2,481,707 | Young | Sept. 13, 1949 |